Jan. 2, 1962 H. JUNGHANS ET AL 3,015,277
PERCUSSION FUZES
Filed May 20, 1958 6 Sheets-Sheet 3
Fig. 4
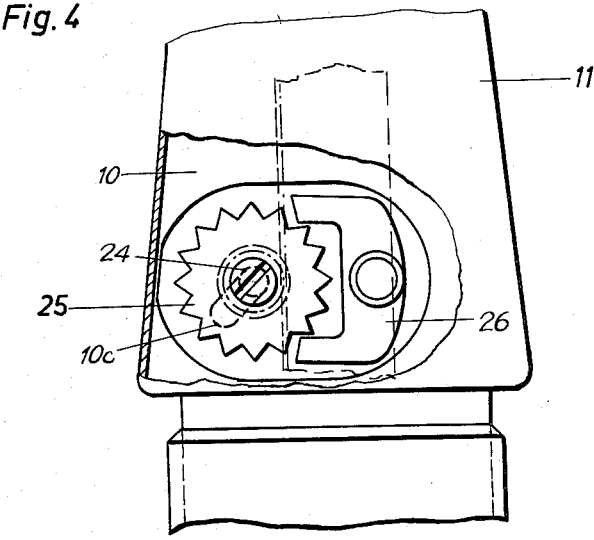
Fig. 5
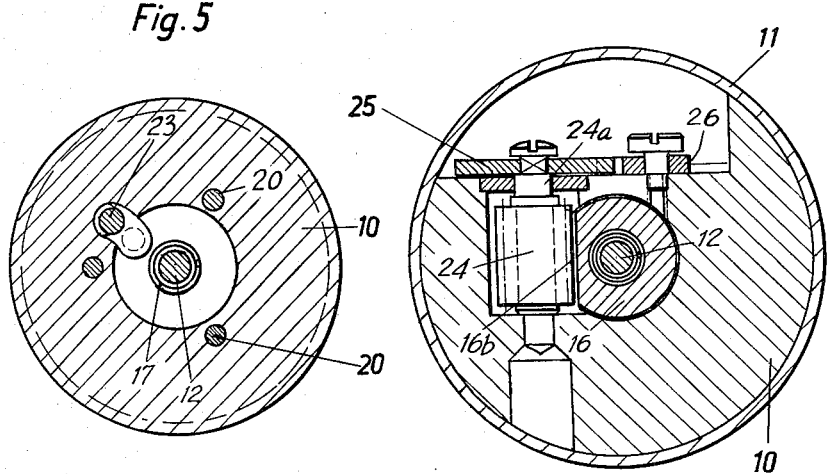
Fig. 6
INVENTORS
H. Junghans
J. Müller
P. Kaiser
BY Watson, Cole, Grindle & Watson
Attys.

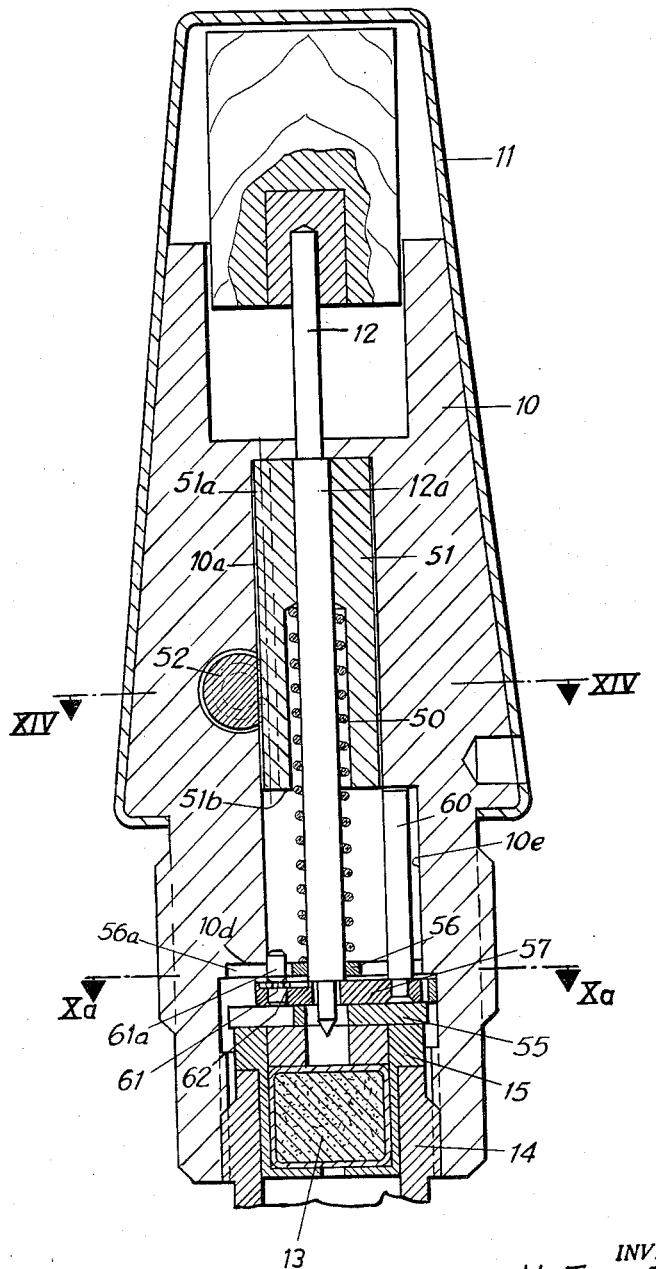

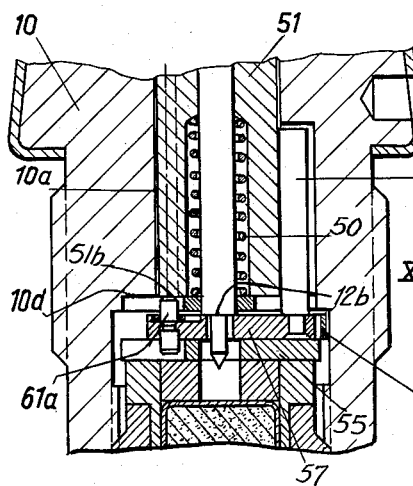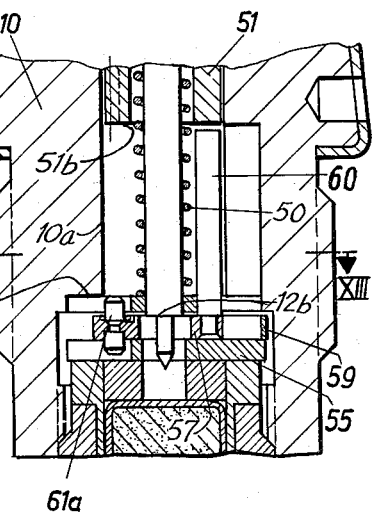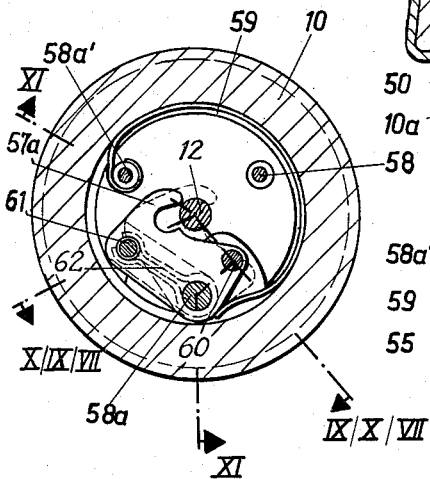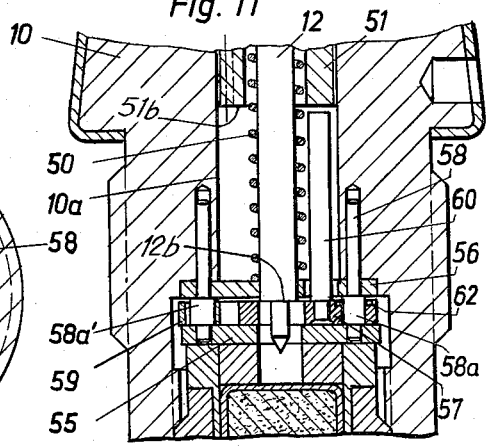

3,015,277
PERCUSSION FUZES
Helmut Junghans, Eckenhof, and Josef Müller, Unotweg 6, both of Schramberg-Sulgen, Germany, and Paul Kaiser, Weihergasse 28, Schramberg, Germany
Filed May 20, 1958, Ser. No. 736,582
Claims priority, application Germany May 20, 1957
5 Claims. (Cl. 102—78)

The invention relates to a percussion fuze, especially for projectiles without rifling, with a time locking device actuated by an inert member. The object of the invention is to produce a safety device which combines constructional simplicity with reliability both as regards its effect as safety device for transport and also as a time fuze (bore-safe fuze and pre-bore safe fuze). The invention is characterized by the arrangement of an inert member axially freely movable against a forward push spring in the fuze, locking means for the percussion firing device disengageable by the inert member in the path of movement of the inert member, and means for retarding at least the rearward movement of the inert member at the termination of acceleration, the disengagement path being made considerably longer than the path the inert member has to travel under a short constant driving impulse, for example a jolt caused by dropping.

The movement of the inert member can be retarded by simple means preferably in that it is constructed as a toothed rack and is used for driving a retarding mechanism. As is known, this can consist of a movement wheel and a movement regulator cooperating therewith, whereby a pinion fixed on the movement wheel shaft meshes with the toothed rack. In the case of projectiles with high firing pressure and short acceleration phase, it may be necessary to retard the return movement of the inert weight only slightly or not at all, but on the other hand to retard the forward movement strongly. This can be attained with a free-wheel arrangement between the toothed rack and the braking device or by fitting a sliding weight acted upon by the back pressure in such a manner that, during the acceleration phase, the sliding weight is moved towards the axis of rotation of the movement regulator and thus reduces its moment of inertia, whereas on the cessation of the acceleration, the sliding weight again tends to move outwards and the duration of oscillation of the movement regulator must thereby become greater.

To lock the percussion ignition device—which is preferably highly sensitive—the invention proposes two preferred solutions: The one is characterized in that on a locking slide engaging under the firing pin a control finger is mounted which extends into the path of movement of the inert member and is intended to bear laterally on the inert member and a lock on the body of the fuze which, when the fuze is inoperative, locks the inert member against forward movement in an intermediate position on its path of movement and, after travelling along a predetermined return path, is switched over into releasing position thereby. This throw-over lock can be constructed in a simple manner as an arresting element, for example a ball, which is located partly in a recess in the fuze body so that it is held in axial position and partly in a channel cut in the circumferential surface of the inert member facing it, which channel is closed at one end, the end face presenting an abutment for the arresting element, and runs at its other end into a recess in which the arresting element is in inoperative position and may also be secured in this position by supplementary means based for example on the utilization of the force of gravity.

The other solution for locking the percussion ignition device during transport and at least during the acceleration of the projectile, is characterized in that on the locking slide engaging under the firing pin, a control finger is provided which extends into the path of movement of the inert member and is intended to bear laterally against the inert member, and a slide bolt engaging half in the locking slide and half in a stationary part of the fuze, which bolt is secured by means of a catch spring and has an extension projecting into the path of movement of the end faces of the inert member in such a manner that, in the return movement of the inert member this, at the end of this movement, pushes forward the slide bolt into its releasing position and, during this movement and during a certain portion of the forward movement occurring on the cessation of the acceleration, the control finger effects the locking of the pin locking slide.

Other features and advantages of the invention will become apparent from the following description of several forms of construction illustrated by way of example in the accompanying drawings and set forth in the claims. The drawings show on an enlarged scale in:

FIG. 1 a first form of construction viewed from the side in longitudinal section taken on line I—I of FIG. 3, the functional parts being in the position they occupy before firing;

FIG. 4 shows in side elevation the braking mechanism for the inert member;

FIG. 5 is a section on line V—V of FIG. 2, and

FIG. 6 is a section on line VI—VI of FIG. 2;

FIG. 7 shows a second form of construction in a similar manner to the first form of construction and is a longitudinal section taken on line VII—VII of FIG. 10, the functional parts being again in the position they occupy before firing;

FIG. 8 is a sectional view taken on line VIII—VIII of FIG. 10 showing the functional parts directly at the end of the acceleration phase, unnecessary parts being omitted for the sake of clearness;

FIG. 9 is a section on line IX—IX of FIG. 10 at the end of the acceleration phase and fully released;

FIG. 10 is a cross-section taken on line X—X of FIG. 7;

FIG. 11 is a longitudinal section taken on line XI—XI of FIG. 10;

Figure 14:
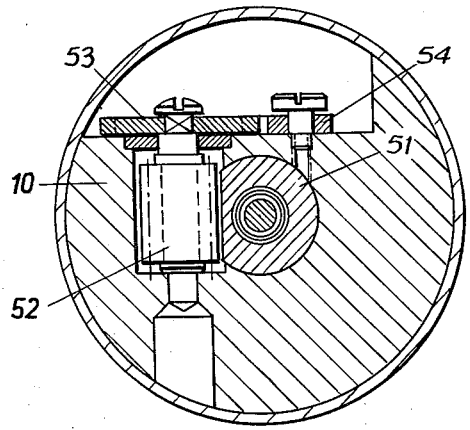

FIG. 14 a section on line XIV—XIV of FIG. 7.

In the first form of construction (FIGS. 1 to 6) 10 designates the body of the fuze, 11 the fuze cap, 12 the firing pin, 13 the pellet, 14 a bottom screw with insertion 15 for the pellet. An inert bolt 16 is slidably mounted on a shaft 12a of the firing pin in a longitudinal bore 10a in the fuze body. Its guide bore is enlarged at the rearward end at 16a to accommodate a portion of a thrust spring 17. This spring 17 bears at its other end against an intermediate plate 18 which closes the rear end of the bore 10a. A second intermediate plate 19 is arranged parallel to the plate 18 and the two plates are held together and fixed in the fuze body by distance pins 20. In the space between the plates the pin locking slide 21 is located. This is pivoted on the bolt head 20a and in locking position (FIGS. 1 and 3) its hook-shaped end 21a engages under the shoulder 12b of the firing pin. A leaf spring 22 is hooked on the bolt head 20a and fitted in pre-stressed state with its end 22a pressing against the locking slide 21 in such a manner that it tends to swing the slide into releasing position (FIG. 3). The pin locking slide 21 is prevented temporarily from carrying out this movement, as will be hereinafter described, by contact of the control finger 23 riveted on its upper side and cooperating with the circumferential surface of the inert bolt 16.

The inert bolt 16 is provided with teeth cut in its circumferential surface and forming a toothed rack 16b which meshes with a pinion 24 on the shaft 24a of the movement wheel 25, which in turn cooperates with the movement regulator (escapement) 26.

It will be apparent from the foregoing description that the inert bolt 16 by cooperation with the control finger 23 on the pin locking slide 21 is responsible for locking in inoperative position (transport lock). To attain this a locking ball 27 is mounted in a lateral bore 10b in the fuze body in such a manner that it lies half in this bore while its other half is located in a channel 16c cut in the circumferential surface of the inert bolt 16 commencing at 16c′ and passing out at 16c″. The locking ball 27 therefore prevents the inert bolt 16 from being pushed forward by the pre-stressed spring 17 right up to the end of the fuze body bore 10a. It can be seen from FIGS. 1 and 2 that, starting from the inert bolt 16 in its inoperative position, a return path is available which is slightly longer than the channel 16c, so that at the end of the return path the locking ball 27 can drop over the edge 16c″ and enter the funnel-shaped recess 16d in the front end face of the inertia bolt, a position in which the locking ball is inoperative.

To ensure that the locking ball 27 seats firmly, a spring pressure bolt 28 with a pressure spring 29 is provided in the fuze body. So that the bolt 28, in the event of the projectile being dropped especially on its point cannot be pushed aside by the inert bolt 16, only a small path of movement is available for the bolt 28 before it contacts the plug screw 30; a collar 28a on the bolt 28 also restricts the forward movement to the permissable distance.

Figure 1:
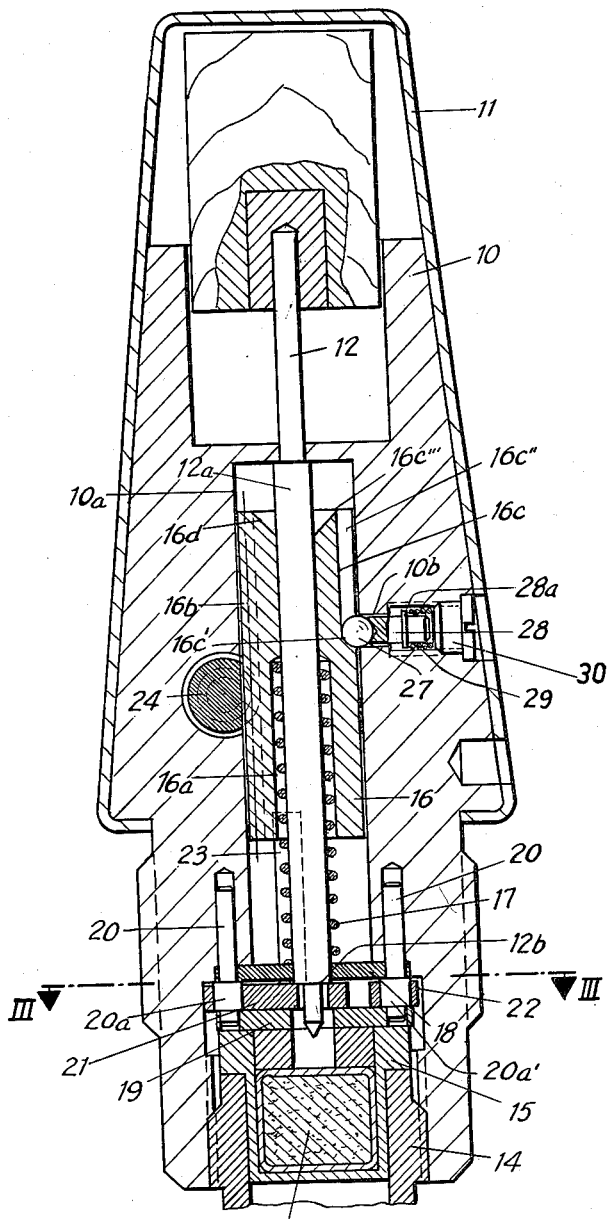
Figure 2:
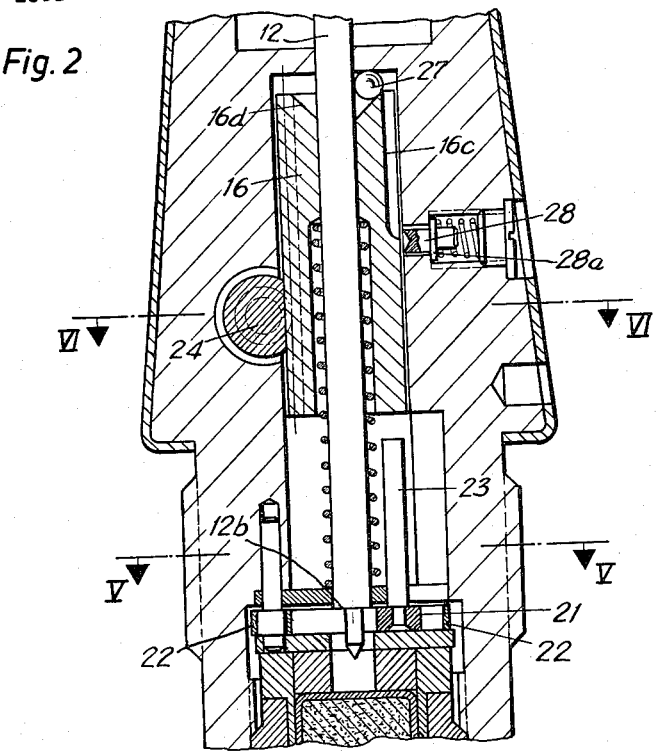
FIG. 2 is a longitudinal section taken on line II—II of FIG. 3, the functional parts being in the position they occupy at the end of the acceleration phase and fully released.
Figure 3:
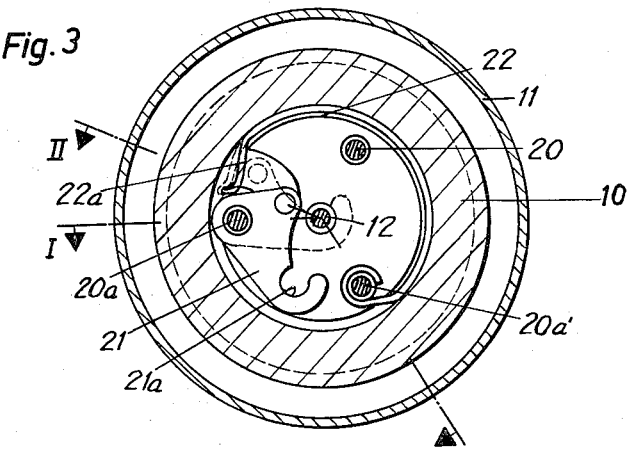
FIG. 3 is a section on line III—III of FIG. 1.
Figure 12:
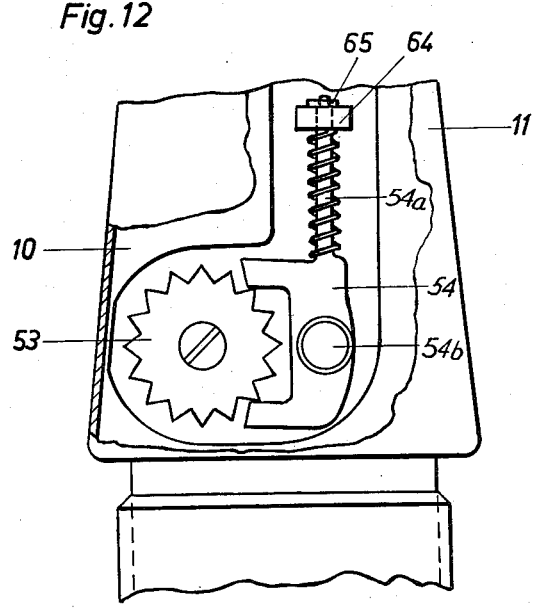
FIG. 12 shows a detail of the retarding mechanism seen from the side.
Figure 13:
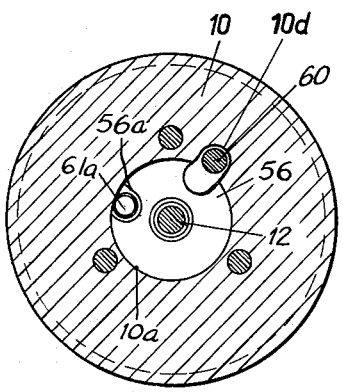
FIG. 13 is a section on line XIII—XIII of FIG. 9.

A comparison of FIGS. 1 and 2 will also show that the control finger 23 is of such length that, when the inert bolt 16 is in its intermediate position, that is before the firing stage, this finger still bears against the circumferential face of the inert bolt and is only clear of the inert bolt when this is just approaching its foremost position (FIG. 2).

The fuze according to the first embodiment of the invention operates in the following manner:

In the inoperative position or position of rest (FIG. 1) the hook-shaped end 21a of the pin locking slide 21 engages under the shoulder 12b of the firing pin 12. The control finger 23 of the pin locking slide bears laterally against the inert bolt 16 and the ball 27 prevents the spring 17 from pushing the inert bolt forward into its releasing position towards the point of the fuze. Although the inert bolt 16 can slide freely against its spring 17, that is backwards, without having to release a lock, this constitutes no danger for its safety in transport, because the jolts occurring in transport are only short impulses as compared with the accelerating phase which is used when firing the projectile. Even in the event of the projectile being dropped on its bottom end, the inert bolt will only carry out a comparatively short backward movement and this will certainly be shorter than the length of the channel 16c.

If the projectile is properly fired from a barrel or a stand, the inert bolt 16 will be carried back during the acceleration phase so far that the locking ball 27 can drop over the edge 16c‴ into the funnel 16d. When the acceleration ceases, the spring 17 can shift the inert bolt forward into its releasing position (FIG. 2) without hindrance. Before this position is reached, the control finger 23 loses its contact with the circumferential surface of the inert bolt 16 and the leaf spring 22 swings the pin locking slide 21 into its releasing position (shown in solid lines in FIG. 3). The fuze is then live.

The return and advance movements of the inert bolt 16 are retarded by the braking mechanism 25, 26 which must drive the inert bolt during its movement.

For projectiles which are fired with preliminary firing pressure and short acceleration phase, the rearward retardation for the inert bolt must be correspondingly short. To render the braking mechanism 25, 26 inoperative during the backward movement, the shaft 24a of the movement wheel 25 (FIG. 4) can be mounted in slot bearings 10c, these slots being downwardly directed towards the bottom of the fuze so that, during the backward movement of the inert bolt 16, the shaft 24a is pushed thereby into its yielding position, whereas the contrary is the case during the forward movement of the inert bolt, the pinion 24 being carried along into engagement position.

In the second embodiment of the invention (FIGS. 7 to 14) 10 designates the fuze body, 11 the cap, 12 the pin, 12a the pin shaft, 13 the pin pellet, 14 the bottom screw with insertion 15. Once again an inert bolt 51 slidable on the pin shaft 12a and cooperating with a pre-stressed feed spring 50 is arranged in a bore 10a in the body of the fuze. A toothed rack 51a is also worked laterally on the inert bolt 51 and the pinion 52 of a braking mechanism, comprising a movement wheel 53 and escapement 54, is mounted in the fuze body.

Likewise a locking slide 57 movable transversely to the axis of the fuze between rigid movement bridges 55 and 56 again serves for locking the pin 12. As in the first form of construction, bolts 58 also serve for fixing the bridges 44, 56 in the body of the fuze and the head 58a of one of the bolts serves as bearing for the pin locking slide 57. The hook-shaped end of this locking slide is designated by 57a and serves for engaging under the shoulder 12b of the pin. Finally the leaf spring 59 is hooked on the bolt head 58a′ and its function is to move the slide 57 out of the safety or locking position shown in broken lines in FIG. 10 into the releasing position indicated in solid lines, in a predetermined time. The control finger 60 projecting upwards parallel to the axis of the fuze is riveted in the pin locking slide 57 by means of its foot. The purpose of this control finger is to ensure by cooperation with the circumferential surface of the inert bolt 51 the reliable timely locking of the pin.

As far as already described above, the fuze according to the second form of construction is substantially identical with the first example. The difference lies in the construction of the locking means for the percussion fuze mechanism during transport and during at least a portion of the acceleration phase. This will be hereinafter described. It will be seen from FIG. 7 that in the position of rest the inert bolt 51 is not located in an intermediate position as in the first form of construction but is in its foremost position and that the control finger 60 of the pin locking slide does not bear against the circumferential surface of the inert bolt 51; consequently it is not locked thereby. Only under the action of acceleration when the inert bolt 51 has shifted back slightly can it take over the function of locking the pin by cooperation with the control finger 60 and the following arrangement performs the function of bridging over this unlocked stage.

The sliding bolt 61 is mounted in a bore 57b in the locking slide 57. A clip spring 62 mounted in a shaped recess in the upper side of the slide 57 prevents the sliding bolt 61 from dropping out of its bore. In safety or locking position (FIG. 7) the head 61a of the slide bolt projects upwards and passing through a slot 56a of the width of the bolt head (FIG. 7) in the plate 56, projects so far (FIG. 7) that the bolt head in locking position (FIGS. 7 and 13) bears laterally against the bore 10a of the fuze body. The slide bolt head 61a is opposite the end face 51b of the inert bolt and, during the backward movement, is pushed downwards thereby (see FIGS. 8 and 9) in such a manner that it can enter laterally into the recess 10d in the body of the fuze. To enable the control finger 60 to carry out a corresponding movement, the recess 10e is provided in the fuze body.

The embodiment of the invention according to the second form of construction operates in the following manner:

Safety during transport is ensured by the slide bolt 61 (FIG. 7); in this position its head 61a bears laterally against the bore 10a and prevents the pin locking slide 57 from moving out of its locked position (shown in solid lines in FIGS. 7 and 10).

After firing and during the acceleration, the inert bolt 51 moves backwards and its circumferential surface comes into contact with the control finger 60. However, the slide bolt 61 still acts as safety device until (FIG. 8) the inert bolt 51 reaches its extreme rearward position and thereby pushes back the slide bolt so that the end face of the bolt head 61a is located below the end face of the recess 10d. The slide bolt thus becomes inoperative and the locking of the pin locking slide 57 is now taken over and maintained solely by the control finger 60 until, on the cessation of the acceleration, the push spring 50 has once more shifted the inert bolt 51 back into its extreme forward position (FIG. 9). In this position the control finger 60 is clear of the inert bolt 51 and the leaf spring 59 can now (FIG. 10) swing the pin locking slide 57 into its inoperative position unimpeded by the slide bolt 61.

In order, in the case of projectiles which are fired with high firing pressure, to reduce the retardation during the backward movement of the inert bolt, an arm 54a directed substantially parallel to the axis of the fuze is provided on the movement regulator 54 and a sliding weight 64 is slidable on this arm against the action of a recoil spring 63, the forward movement of this weight being limited by a stop 65. While the acceleration force is operative, the weight 64 runs towards the pivot 54b of the movement regulator and thereby its oscillation period is also reduced by the movement of inertia thereof; however when the acceleration force ceases to act, the period of oscillation again increases as the sliding weight 64 tends to resume its initial position.

The variation of inertia on the movement regulator and also the arrangement of free wheel mechanism described in connection with the first form of construction, for the purpose of cutting out partly or entirely a retarding mechanism during the backward movement of the inert member, can be used not only in fuze constructions according to the present invention but is of general importance beyond these.

We claim:

1. Percussion fuze particularly for unrified projectiles comprising a fuze body, an inert member slidable in the body in a backward movement, a firing pin relatively slidable in the inert member, a thrust spring around the pin and bearing against the inert member with the latter movable against the action of the thrust spring, means for retarding the backward movement of the inert member with a disengagement path being considerably longer than the path the inert member has to travel in the event of a driving impulse of short duration, the inert member having a toothed rack connected with the retarding means by a pinion, a movement wheel and a movement regulator, a recoil spring around the firing pin and bearing against the inert member, and a locking weight pivotally mounted in the fuze body for the regulator shiftable during the acceleration towards the center of gravity of the movement regulator and cooperating with the recoil spring.

2. Percussion fuze particularly for unrified projectiles comprising a fuze body, an inert member slidable in the body in a backward movement, a firing pin relatively slidable in the inert member, a thrust spring around the pin and bearing against the inert member with the latter movable against the action of the thrust spring, means for retarding the backward movement of the inert member with a disengagement path being considerably longer than the path the inert member has to travel in the event of a driving impulse of short duration, a control finger in the body extending along the path of movement of the inert member to bear laterally thereon for locking the percussion ignition device during transport and during the acceleration of the projectile, and a locking element laterally mounted in the fuze body for locking the inert member against forward movement in an intermediate position in its path of movement when the fuze is in inoperative condition, said locking element being switched over into release position by the inert member after having performed a predetermined back movement after acceleration.

3. Percussion fuze particularly for unrified projectiles comprising a fuze body, an inert member slidable in the body in a backward movement, a firing pin relatively slidable in the inert member, a thrust spring around the pin and bearing against the inert member with the latter movable against the action of the thrust spring, means for retarding backward movement of the inert member with a disengagement path being considerably longer than the path the inert member has to travel in the event of a driving impulse of short duration, a control finger in the body extending along the path of movement of the inert member to bear laterally thereon for locking the percussion ignition device during transport and at least during the acceleration of the projectile, and a locking element laterally mounted in the fuze body for locking the inert member against forward movement in an intermediate position in its path of movement when the fuze is in inoperative condition, said locking element being switched over into release position by the inert member after having completed a predetermined back movement, the locking element for the inert member consisting of a locking body which is located partly in a recess in the fuze body maintaining the locking element in its axial position and partly into a channel cut in the circumferential surface of the inert member facing it, said channel being closed at one end and open at the other end and forming an abutment for the locking body and extending at its other end into a recess in the inert member in which the locking element is received and is maintained in this position.

4. Percussion fuze particularly for unrified projectiles comprising a fuze body, an inert member slidable in the body in a backward movement, a firing pin relatively slidable in the inert member, a thrust spring around the pin and bearing against the inert member with the latter movement against the action of the thrust spring, means for retarding at least the backward movement of the inert member in the event of a driving impulse of short duration, a control finger in the body extending along the path of movement of the inert member to bear laterally thereon for locking the percussion ignition device during transport and at least during the acceleration of the projectile, a locking element laterally mounted in the fuze body for locking the inert member against forward movement in an intermediate position in its path of movement when the fuze is in inoperative condition, said locking element being switched over into release position by the inert member after having performed a predetermined back movement, and a thrust spring and a spring loaded bolt to press and engage the locking body with the bolt and consisting of a ball engaging against the inert member, the movement of said bolt with the spring being smaller than the depth of engagement of the locking body in the inert bolt.

5. Percussion fuze particularly for unrified projectiles comprising a fuze body, an inert member slidable in the body for forward and backward movement, a firing pin relatively slidable in the inert member, a thrust spring around the pin and bearing against the inert member with the latter movable against the action of the thrust spring, means for retarding at least the backward movement of the inert member in the event of a driving impulse of short duration, a locking slide in the fuze body to contact the firing pin, a control finger mounted on the locking slide engaging under the pin and extending into the path of movement of the inert member to bear against the inert member, a slide bolt and ball of which one half of the ball engages in the control slide and the other half in a stationary part of the fuze and the slide bolt being secured in position by a catch spring, and an extension of the slide bolt projecting into the path of movement of an end face of the inert member so that, during the backward movement of the inert member it will push the slide bolt forward into releasing position at the backward movement and the control finger and during this movement and during a predetermined portion of the forward movement occurring after the acceleration has ceased, continues to lock the pin locking slide.

References Cited in the file of this patent

UNITED STATES PATENTS

| | | |
|---|---|---|
| 2,030,085 | Woodberry | Feb. 11, 1936 |
| 2,486,362 | O'Brien | Oct. 25, 1949 |
| 2,685,253 | Apotheloz | Aug. 3, 1954 |
| 2,709,962 | Funk | June 7, 1955 |
| 2,779,286 | Marshall | Jan. 29, 1957 |
| 2,801,589 | Meek | Aug. 6, 1957 |
| 2,817,295 | Wylie | Dec. 24, 1957 |
| 2,836,118 | Hjelm | May 27, 1958 |
| 2,850,979 | Hardwick | Sept. 9, 1958 |
| 2,853,007 | Casati | Sept. 23, 1958 |
| 2,870,713 | Saloranta | Jan. 27, 1959 |
| 2,893,322 | Leroy | July 7, 1959 |